July 18, 1967 V. D. POLHEMUS ET AL 3,331,599
VEHICLE LEVELING SYSTEM

Filed March 30, 1965 3 Sheets-Sheet 1

INVENTORS
Von D. Polhemus
Peter B. Loomis
Gerard T. Klees
Robert W. Plume
BY
J. C. Evans
THEIR ATTORNEY July 18, 1967  V. D. POLHEMUS ET AL  3,331,599
VEHICLE LEVELING SYSTEM
Filed March 30, 1965  3 Sheets-Sheet 2

INVENTORS
Von D. Polhemus
Peter B. Loomis
Gerard T. Klees
Robert W. Plume
BY
J. C. Evans
THEIR ATTORNEY

Fig. 5

INVENTORS
Von D. Polhemus
Peter B. Loomis
Gerard T. Klees
Robert W. Plume
BY
J.C. Evans
THEIR ATTORNEY United States Patent Office 3,331,599
Patented July 18, 1967

3,331,599
VEHICLE LEVELING SYSTEM
Von D. Polhemus, Pontiac, Peter B. Loomis, Birmingham, Gerard T. Klees, Rochester, and Robert W. Plume, Utica, Mich., assignors to General Motors Corporation, Detroit, Mich., a corporation of Delaware
Filed Mar. 30, 1965, Ser. No. 443,874
18 Claims. (Cl. 267—34)

This invention relates to vehicle suspension and more particularly to a self-pumping vehicle suspension unit having a primary coil spring associated with a hydraulically displaceable spring seat.

One problem in vehicle suspension systems occurs when heavy loads are imposed on the sprung mass. Such loads cause a resultant compression of the primary coil or main spring components in vehicle suspension systems that can adversely affect the riding qualities of the vehicle. Furthermore, there is a reduction in clearance between the vehicle and its supporting axle to increase the possibility of the vehicle body bottoming out or impacting against the axle housing.

One solution to this problem is the provision of a pressurizable hydraulic unit for adjusting the position of one of the seats of the primary spring suspension component to compensate for load produced deflections therein by effectively fluidly jacking the vehicle body away from its supporting axle structure when additional loadings are placed on the sprung mass represented by the vehicle body. Such a unit is illustrated in United States Patent No. 3,123,349, issued Mar. 3, 1964, to Cislo, which discloses a hydraulic unit controlled by load responsive valve means for adjusting a spring seat to accomplish this purpose. In the arrangement illustrated in the Cislo patent the load responsive valve unit controls both fluid flow into and out of the hydraulic unit in response to load changes. While the Cislo arrangement is suitable for its intended purpose, its valve control is rather complex and, moreover, the suspension unit depends upon an auxiliary pressure source to be operative.

An object of the present invention, therefore, is to automatically level the sprung mass of a vehicle relative to its unsprung mass by the provision of a combination suspension unit including a primary load supporting coil spring supported between a fixed spring seat and a movable spring seat wherein the movable spring seat is associated with a pressurizable hydraulic jack assembly including a movable member that adjusts the position of the movable spring seat under the controlling action of fluid control means directly responsive to changes in the load of the sprung mass and operable to quickly regulate the jack position by the inclusion of control valve means solely operative to regulate the exhaust of pressurized fluid from the jack assembly through an outlet therefrom.

A further object of the present invention is to automatically level the sprung and unsprung masses of a vehicle or the like by the provision of a combination suspension unit including a primary coil spring supportingly receved between a fixed and a movable spring seat and a hydraulic shock absorber serving as a positive displacement unidirectional pump for supplying fluid to a hydraulic jack assembly having a movable member associated with the movable spring seat and fluid control means directly responsive to changes in the the load on a sprung mass for controlling fluid flow between the shock absorber unit and the jack assembly for adjusting the position of the movable spring seat to maintain a predetermined height relationship between the unsprung and sprung masses.

Still another object of the present invention is to improve automatic leveling units for association with the sprung and unsprung masses of a vehicle by the provision of a combination hydraulic shock absorber and coil spring assembly operatively related through a hydraulic jack unit for adjusting the position of a movable spring seat by directly receiving pressurized fluid from a positive displacement unidirectional pumping action of the shock absorber and wherein the position of the movable spring seat is controlled by means for selectively controlling pressurized flow from the jack back to the shock absorber directly in response to changes in the load on the sprung mass.

Still another object of the present invention is to improve automatic leveling vehicle suspension systems for association with the sprung and unsprung masses of a vehicle by the provision of a compactly arranged combination suspension unit including a primary coil spring disposed about a hydraulic shock absorber unit serving as a unidirectional positive displacement pump for directing pressurized fluid into a hydraulic jack assembly disposed between the coil spring and the shock absorber and including control means directly responsive to changes in the load on the sprung mass for controlling fluid flow between the shock absorber and the jack to compensate for changes in the height relationship between the sprung and unsprung masses produced by compression of the primary coil spring.

Still another object of the present invention is to improve the responsiveness of a hydraulic spring seat in an automatic vehicle leveling system including a primary coil spring supported in part by the movable spring seat by the provision of a pressure responsive hydraulic jack assembly associated with the movable seat for adjusting the position thereof directly in response to changes in the load of the sprung mass by a control unit including a poppet valve unit operative to control the flow of fluid from the hydraulic jack in response to such load changes.

Yet another object of the present invention is to improve automatic leveling systems for association with the sprung and unsprung masses of a vehicle by the provision of a coil spring assembly operatively associated with a pressurizable hydraulic jack unit that includes a movable member for adjusting the position of a movable spring seat to compensate for coil spring deflection under the control of valve means including means sensing the pressure in the jack unit and operative in response to load changes on the coil spring to selectively exhaust pressurized fluid from the jack to adjust the movable spring seat for maintaining a predetermined height relationship between the sprung and the unsprung masses; and to improve such leveling systems by including improved valve damping means in association with the valve means for preventing undesirable oscillations thereof in response to transient pressure changes in the hydraulic jack.

Further objects and advantages of the present invention will be apparent from the following description, reference being had to the accompanying drawings wherein a preferred embodiment of the present invention is clearly shown.

Figures 1, 2, 3:
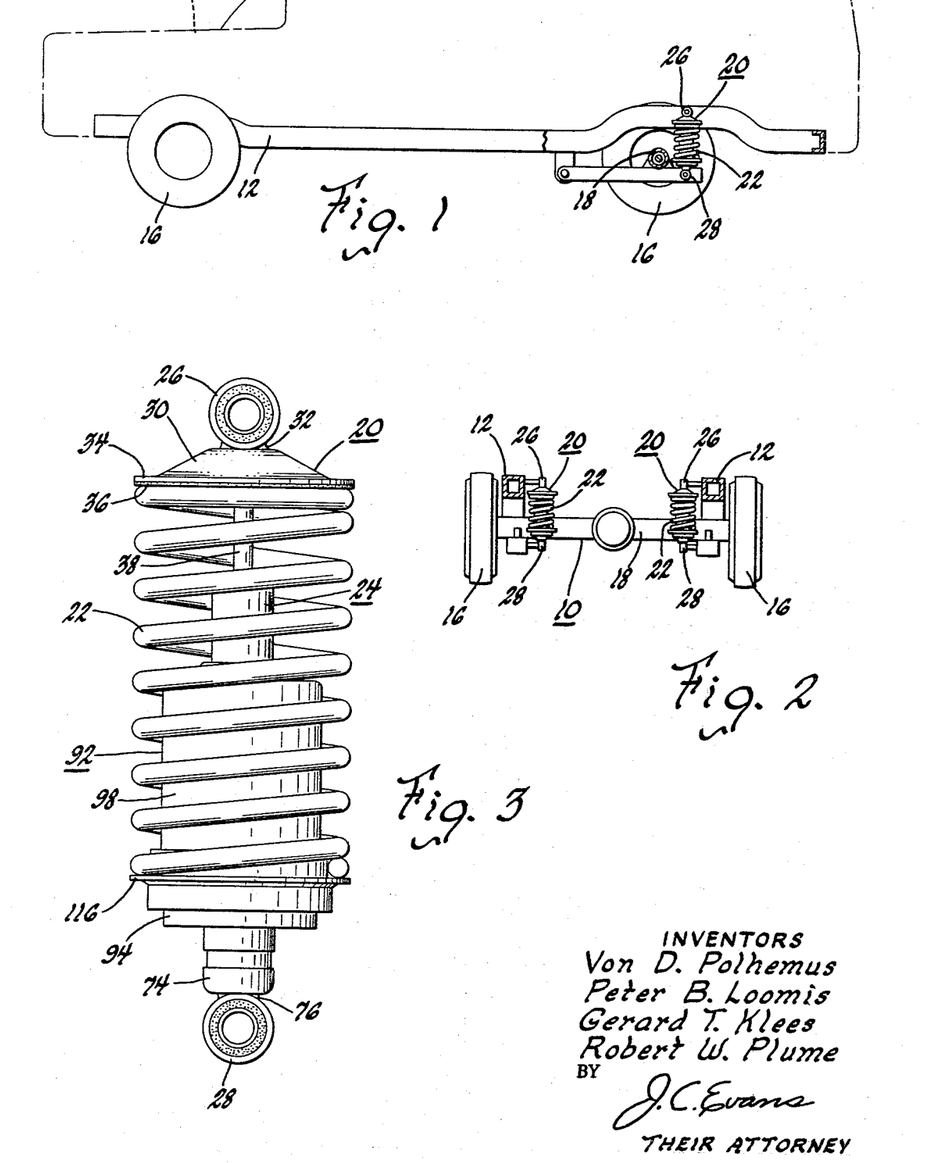
FIGURE 1 is a view in side elevation of a vehicle including the automatic leveling system of the present invention.
FIGURE 2 is a view in end elevation of the vehicle of FIGURE 1.
FIGURE 3 is an enlarged view in elevation of the suspension unit of the present invention.

In FIGURES 1 and 2 of the drawings, a vehicle 10 is illustrated comprising a sprung mass including a chassis frame 12 and a body 14 supported thereon which is supported upon an unsprung mass represented by ground engaging wheels 16 supported by front suspension assemblies (not shown) and a rear axle housing 18. Between the chassis frame 12 and the axle housing 18 adjacent each of the wheels 16 thereon is located a self-leveling suspension assembly 20 including a primary coil spring 22 concentrically disposed about a double, direct-acting hydraulic shock absorber unit 24 having connection fittings 26, 28 at either end thereof connected respectively to the chassis frame 12 and the axle housing 18.

Figures 4, 6, 7:
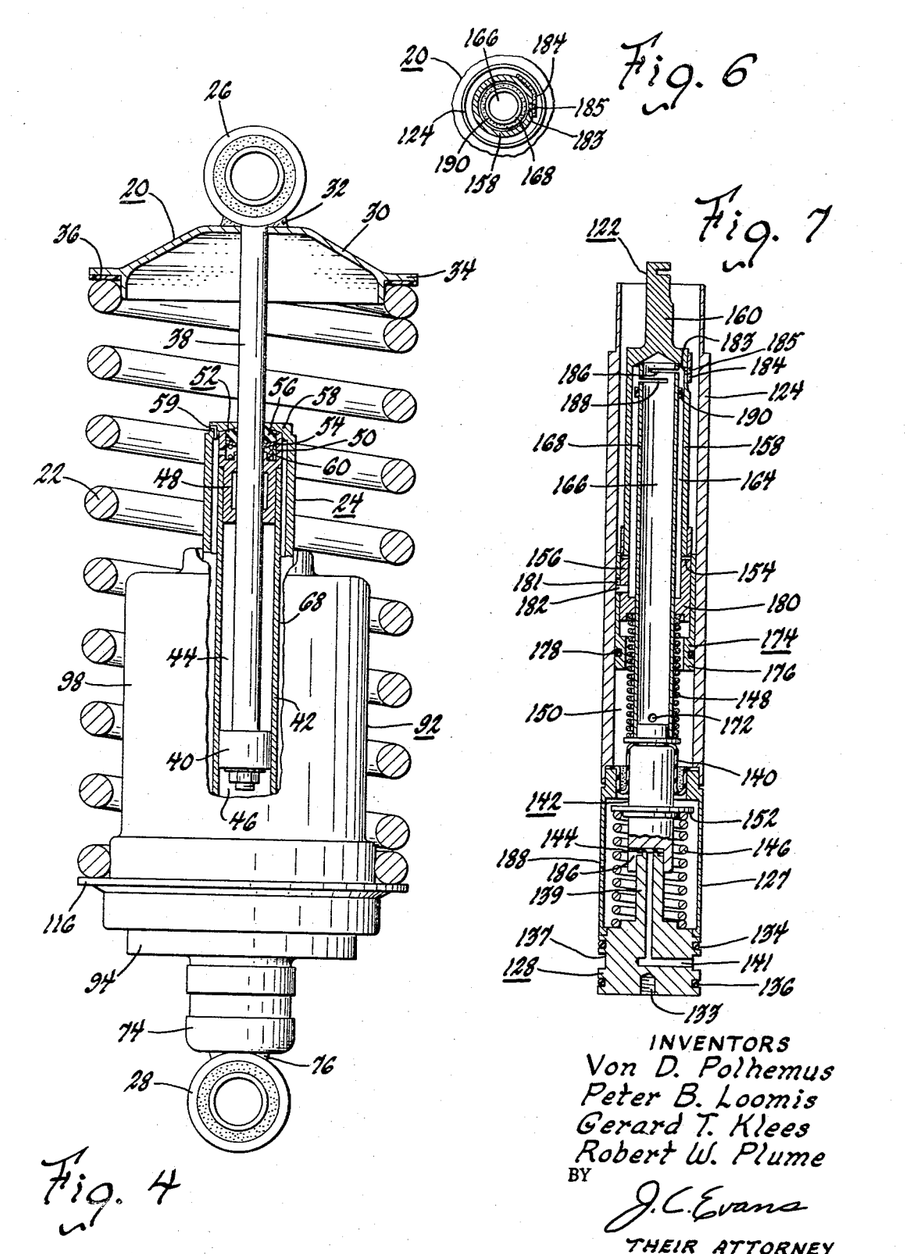
FIGURE 4 is an enlarged view, partially in vertical section of the unit of FIGURE 3.
FIGURE 6 is a view in horizontal section taken along the line 6—6 of FIGURE 5.
FIGURE 7 is a fragmentary view in vertical section of the control valve assembly of FIGURE 5 in a retracted position.

Referring now to FIGURE 4, the shock absorber 24 is more particularly shown as including a fixed spring seat assembly 30 secured to the shock absorber unit 24 below the upper connection fitting 26 thereon at 32 by suitable means such as welding. The seat member 30 has an outer peripheral edge 34 thereon with a bonded annular resilient insulator member 36 secured to the underside thereof for receiving the upper end of the coil spring 22. Secured to the fixed seat member 30 and the upper connection fitting 26 is a depending reciprocating rod 38 having a piston assembly 40 secured on the end of rod 38 and slidably reciprocably received within a shock absorber pumping cylinder 42 serving to divide the cylinder 42 into an upper variable volume rebound chamber 44 and a lower variable volume compression chamber 46. An upper opened end of the pumping cylinder 42 has a rod guide member 48 received therein that includes a cavity 50 in its upper end supportingly receiving a rod seal assembly 52. The seal assembly 52 includes a seal retainer 54 located in axial abutment against one end of an annular seal member 56 that is sealingly biased against a tubular seal assembly cover 58 by a spring 60 disposed between the guide member 48 and the underside of the seal retainer 54. The seal assembly cover 58 has a top vent opening 59 and a lower threaded end 62 thereof threadably received in an internally threaded upper end portion 64 of a tubular body member 66 which supports an annular seal member 67 to prevent leakage from interiorly of the cover 58. The body member 66 is located concentrically around the pumping cylinder 42 in spaced relationship thereto to form a fluid reservoir passageway 68 in the shock absorber assembly 24 and a surrounding reservoir chamber 69 which are communicated through an opening 71 in body member 66 as best seen in FIGURE 5.

Figure 5:
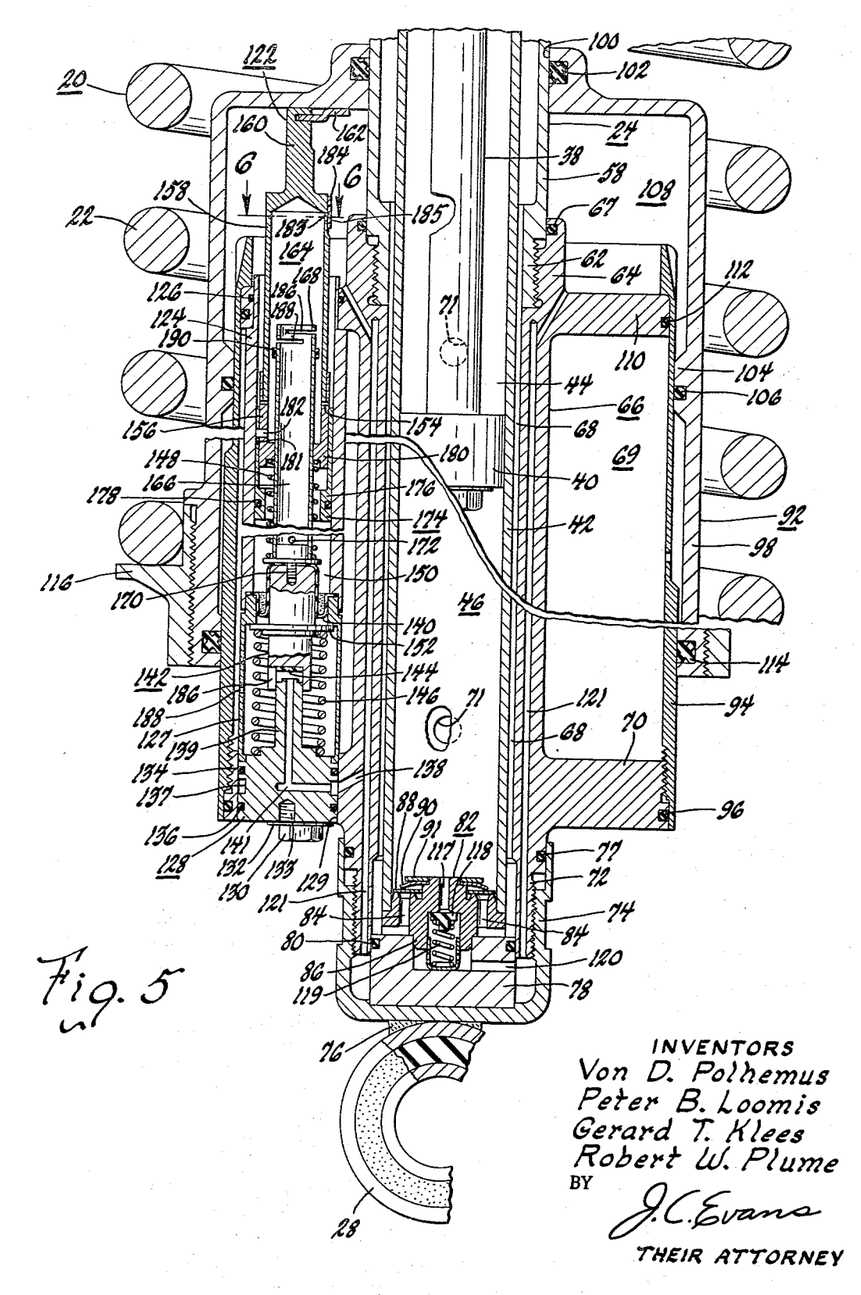
FIGURE 5 is an enlarged, fragmentary view in vertical section of the unit of FIGURE 4 showing the jack unit and control valve assembly therein.

With more particular reference to FIGURE 5, the reservoir forming body 66 is seen as including a base portion 70 with a downwardly depending tubular extension 72 thereon threadably received within a lower end cap 74 of the shock absorber 24 that is fixedly secured to the lower connection fitting 28 by suitable fastening means such as welding at 76. An annular seal 77 in the extension 72 engages cap 74 to prevent fluid leakage from its interior.

Within the lower cap 74 is located an end closure member 78 serving to close the lower opened end of the body 66 forming the reservoir passageway 68. The member 78 has an annular seal 80 supported in its outer periphery for preventing fluid flow from the passageway 68 into the interior of the cap 74.

Supported above the closure member 78 is a base valve assembly 82 that closes the bottom opened end of the pumping cylinder 42.

The illustrated shock absorber includes a suitable hydraulic fluid therein acted upon by the piston assembly 40 upon relative movement between the sprung and unsprung masses to produce fluid damping of such relative movement by restricting fluid flow across valving components in the piston 40 which are representatively shown as being of a type more specifically set forth in United States Patent No. 2,785,775, issued Mar. 19, 1957, to Long et al. The damping action also in part depends upon the flow of fluid across valving components in the base valve assembly 82. More particularly, upon relative movement of the sprung mass toward the unsprung mass, the piston 40 will displace fluid from the compression chamber 46 outwardly across valve assembly 82 to compensate for the volume occupied by the rod 38 as it enters the pumping cylinder 42 to thereby, along with the fluid flow from the compression chamber 46 into the rebound chamber 44 across the valving components in the piston 40, produce a predetermined compression damping action.

Upon relative movement of the sprung mass away from the unsprung mass, the piston 40 is moved upwardly in the pumping cylinder 42 to force fluid from the rebound chamber 44 across the valving components in the piston 40 into the compression chamber 46 to produce a predetermined rebound damping action. To supply fluid to make up the volume of the rod 38 as it passed outwardly of the pumping cylinder 42, fluid flows from the reservoir passageway 68 through passageways 84 in a valve plate 86 of the base valve assembly 82 thence across a one-way annular disc valve 88 held against the valve plate 86 by an annular spring 90 secured to the plate 86 by a snap ring 91.

The above-described fluid flow for effecting damping action is merely representative of a typical double, direct-acting hydraulic shock absorber fluid circuit with it being understood that other like structures with modified fluid flow paths would be equally suited for use in the suspension unit 20 of the present invention.

In accordance with certain principles of the present invention, the shock absorber 24 serves as a positive displacement unidirectional pump for supplying pressurized fluid to a hydraulic jack assembly 92 concentrically disposed between the primary coil spring 22 and the shock absorber unit 24. The jack assembly 92, more particularly, includes an inner jack tube 94 having a lower opened end supportingly received upon the base 70 of the reservoir-forming body member 66. The base 70 has an outer peripheral groove therein supportingly receiving an annular sealing member 96 that sealingly engages the tube 94 to prevent fluid leakage across the interface between tube 94 and base 70. Telescopingly received about the tube 94 is an inverted cup-shaped movable jack piston member 98 that has a central opening 100 in the bottom thereof having the seal cover member 58 of the shock absorber 24 directed therethrough. At the opening 100 the member 98 is slidably supported by the cover 58 for relative axially guided movement and the guided surface on the member 98 includes a recess for receiving an annular sealing member 102 that sealingly engages the outer surface of the cover member 58 during the relative guided movement therebetween. Below the bottom of the member 98 is a radially inwardly formed ring 104 slidably supported by an outer surface portion of the jack tube 94 for additionally guidingly supporting relative movement between the tube 94 and the movable piston member 98. The ring 104 has a groove formed therein supportingly receiving an annular sealing member 106 which, along with seal 102, seals the ends of a pressurizable variable volume jack cavity 108 formed within the jack unit 92 by the fixed jack tube 94, the movable piston member 98 and an upper head portion 110 on the reservoir forming body member 66 that is fitted in the upper end of the tube 94. While annular sealing members 102, 106 are used to prevent fluid leakage from the cavity 108, other equivalent seal structures such as Bellofram type units would be equally suited for use in the suspension unit of the present invention.

The head 110 includes a peripheral recess that receives an annular sealing member 112 for sealing the interface between the head 110 and the tube 94. At the lower end of the movable piston member 98 a recess is formed in the inner periphery thereof for receiving an annular sealing member 114 for sealing the end of the movable piston member 98 with respect to the fixed member 94. On the outer periphery of the movable piston member 98 at the lower end thereof is fastened a movable spring seat 116 that supportingly receives the opposite end of the primary coil spring 22.

Upon relative movement between the sprung and unsprung masses, when the piston rod 38 of the shock absorber 24 displaces fluid from the compression chamber 46, it passes through an opening 117 in the valve plate 86 thence across a check valve 118 biased closed by a spring 119 thence through a passageway 120 in closure member 78 into the interior of end cap 74. The fluid then passes directly into the cavity 108 in the jack unit 92 through inlet passageways 121 in the body member 66. The input flow to the jack is dependent upon the area of the piston rod 38 and the relative velocity between the suspended vehicle body or sprung mass and the suspension unit 20. Pressurization of the cavity 108 maintains the spring seat 116 in adjusted relationship with the spring 22 to compensate for compression therein caused by variable loading of the sprung mass.

More particularly, the volume of the cavity 108, in accordance with certain other of the principles of the present invention, is maintained at a predetermined point related to loading on the sprung mass under the control of a fluid control valving assembly 122 that is directly responsive to instantaneous changes in the weight of the unsprung mass to adjust the volume in the cavity 108 whereby the spring seat 116 will be continuously adjusted to a position whereby a predetermined desired height relationship will be maintained between the sprung and the unsprung masses.

The control valve assembly 122, more particularly, includes a tubular outer housing 124 arranged in spaced parallelism with the reservoir body 66 at one side thereof, as best seen in FIGURE 5. The upper end of the housing 124 is directed through the head 110 of the body 66 and is sealed against leakage from the cavity 108 by an annular sealing element 126 received in a groove in the head 110. A lower separated end portion 127 of the housing 124 fits over the end of a gland element 128 secured in an opening 129 in the base 70 by a screw 130 threaded into the base 70 to hold a washer 132 against the end of the gland element 128 for holding it in place within the base 70. The exposed end of the element 128 is internally threaded at 133 so as to be adapted to receive a suitable tool for removing the element from the opening 129.

The gland element 128 also has first and second annular sealing members 134, 136 in the outer periphery thereof that engage base 70 to seal against leakage from the interior of the jack unit 92. A peripheral groove 137 in the gland element 128 located between the seal members 134, 136 communicates with the jack cavity 108 through a passageway 138 in the body 66 that communicates with one of the inlet passageways 121 directing pressurized fluid from the shock absorber 24 into the cavity 108.

On the gland element 128 is formed a tubular extension 139 directed interiorly of the end portion 127 of housing 124. The interior of the tubular extension 139 communicates with passageway 138 through a lateral passageway 141 in the gland element 128.

Between the upper part of housing 124 and the end portion 127 thereof is held a diaphragm 140 having a depending poppet valve member 142 secured thereon to be located within the end portion 127 where a resilient disc 144 on the end of the poppet valve member 142 can engage the upper opened end of the tubular extension 139 to seal against flow of fluid from the jack cavity 108 into the interior of the housing end portion 127.

The poppet valve member 142 is moved into opened and closed positions with respect to the tubular extension 139 by the resultant force of a valve opening spring 146, an extension or modulating spring 148 and a fluid pressure within a pressurizable chamber 150 formed within the valve housing 124 above the diaphragm 140. More particularly, the valve opening spring 146 is disposed within the end housing portion 126 concentrically around the tubular extension 139 and the end of the poppet valve member 142 so that one end thereof engages the top of the gland element 128 and the opposite end thereof engages a radially outwardly directed flange 152 on the poppet valve member 142 whereby the spring serves to bias the poppet valve member to an open position.

As best seen in FIGURE 5, the pressurizable fluid cavity 150 communicates with the jack cavity 108 through the upper opened end of the tubular valve housing 124 thence through openings 154 in a flow control sleeve 156 secured on one end of a tubular valve actuator member 158 concentrically disposed within the tubular housing 124 at the upper end thereof and having a stem 160 on the end thereof grooved to receive a support bracket 162 secured to the piston member 98 of the jack unit 92. The pressurized fluid in the cavity 108 flows through the openings 154 into a space 164 interiorly of the actuator member 158 thence through an interior opening 166 in a tubular guide stem 168 directed through the flow control sleeve 156 into the cavity 150 where it is secured to the poppet valve member 142 by a screw element 170. The pressurized fluid in the space 166 flows therefrom through an opening 172 in the guide stem 168 interiorly of the cavity 150. The cavity 150 is sealed at its lower end by the diaphragm 140 and at its upper end by a movable fluid flow damper member 174 having a cylindrical end 176 with an annular sealing member 178 supported in its outer periphery to sealingly engage the inside surface of the valve housing 124. The fluid damper member 174 also includes a tubular sleeve extension 180 on its cylindrical end 176 that is telescopingly received over the fluid control sleeve 156. A groove 181 in the sleeve extension 180 receives a pin 182 on sleeve 156 to limit relative movement therebetween. By virtue of the above-described fluid communication between the jack cavity 108 and the pressurizable chamber 150, a resultant force is imposed on the diaphragm 140 to produce a valve closing action through the poppet valve member 142.

The extension or modulating spring 148 is located within the pressurizable cavity 150 and disposed about the end of the stem 168 disposed therein so that one end thereof biasingly engages the end of the stem 168 where it is joined to the poppet valve member 142 and the opposite end thereof is biased against the underside of the fluid flow control sleeve 156 whereby a force is directed against the poppet valve member 142 to move it into a closed position. The control valve assembly 124 further includes an opening 183 in the member 158 communicating the interior space 164 of the valve actuator member 158 with the jack cavity 108 across an orifice opening 185 in an orifice element 184 that is located on the member 158.

When the suspension unit 20 supports a first predetermined loading on the sprung mass as, for example, when the vehicle is empty, a first predetermined pressure is present in the variable volume jack cavity 108 so as to maintain a desired height relationship between the sprung and unsprung masses. At this time, the resultant spring and pressure forces acting on the poppet valve member 142 are balanced so as to maintain the valve disc 144 in a position to block fluid flow from the cavity 108 interiorly of the end housing portion 127. When additional loading is placed on the sprung mass, an instantaneous pressure increase occurs in the jack cavity 108 by virtue of the spring 22 directing a greater force against the movable spring seat 116 on the jack unit 92. The increased pressure in the cavity 108 is directed against the diaphragm 140 in the valving assembly 122, as discussed above, to produce a greater resultant valve closing action against the opening force of the spring 146. Subsequent relative movements between the sprung and unsprung masses will then cause the piston 40 of the shock absorber 24 to direct fluid through the base valve assembly 82 thence through the passageways 120 and 121 into the jack cavity 108. The jack piston 98 is thereby displaced upwardly with respect to the jack tube 94 to adjust the spring seat 116 to a load carrying position to compensate for deflection in the primary coil spring 22 so as to cause the sprung mass to return to a desired predetermined height relationship with respect to the unsprung mass.

During the adjustment of the spring seat 116 produced in response to additional loading on the sprung mass, the valve actuator member 158 is carried upwardly by the piston member 98 to cause the fluid flow control sleeve 156 on the end thereof to move away from the poppet valve member 142. This causes the modulating or extension spring 148 to assume a more extended position to thereby produce a lesser resultant closing force on the poppet valve member 142. When the spring 148 reaches a predetermined extended position because of the pumping up of the jack unit 92, the valve opening force of spring 146 balances the valve closing action of the diaphragm 140 and that of the extension spring 148. At this time, upon additional pumping action of the shock absorber unit 24, fluid displaced into the cavity 108 will raise the jack piston 98 a slight distance to further reduce the valve closing force of spring 148 whereby the poppet valve 142 is subjected to a greater opening force than closing force so that the resilient disc 144 is moved upwardly as shown in FIGURE 5 to allow pressurized fluid to flow from the cavity 108 through one of the passageways 120, 121, the passageway 138, thence through the passageway 141 in the gland element 28 and through the tubular extension 139. Flow then passes across a lateral opening 186 in the end of the poppet valve member 142 and interiorly of the end housing portion 127, thence through openings 188 in the member 127 into the reservoir chamber 69.

The excess fluid pumped by the shock absorber 24 into the cavity 108 is thereby bled into the reservoir chamber 69 to prevent an overextension of the jack from a position where the movable spring seat 116 is positioned to maintain a desired height relationship. The poppet valve member 142 will pulsatingly control bleed back to the reservoir chamber 69 so as to maintain the movable seat 116 closely adjusted to its desired height controlling position. By virtue of the provision of the poppet type valve reliable valving action is assured since any particles in the hydraulic fluid are carried through the relatively open fluid flow path therethrough without becoming jammed between valving components.

While spring seat adjustment may desirably fully compensate for load produced deflection in the primary coil spring 22, the spring load of the bias spring 146 may be selected to open the poppet valve member 142 before the movable seat 116 is moved to fully compensate for all spring deflection produced by additional loading. Such an arrangement is desirable where there is no load compensation on the front end of a vehicle. In such a case, for example, when two passengers are in the front seat of a vehicle, such as that shown in FIGURE 1, the loading on the front end can cause it to nose down. If the rear suspension units were to fully compensate for additional rear loading, the nose down effect would be accentuated. To minimize this effect, in certain cases, it might be desirable to provide only a partial leveling in the rear suspension units by preselecting the rate of extension spring 148 and preload of spring 146 to produce only a partial compensation for deflection in the primary coil spring 22 so that the attitude of the vehicle from front to rear will be maintained lower but more even than would be the case with a full compensating unit.

Another feature of the illustrated control valve assembly 144 is the provision of a valve damping action therein operative to prevent an undesirable retraction of the jack unit 92 under certain operating conditions. More particularly, when the sprung mass of a vehicle is displaced relative to the unsprung mass as, for example, when the vehicle passes around a long curve, the jack unit which has a reduced loading thereon is retracted by bleeding pressurized fluid from the cavity 108 back to the reservoir chamber 69 under the control of valve assembly 122 and the jack unit with increased loading thereon is extended to maintain a stable vehicle attitude in the curve.

While the change in jack positions in the curve is desirable, such change is preferably maintained within predetermined limits to allow for a fairly quick return of the movable spring seats 116 to level straight-away loading support positions. To accomplish this desirable result in the control valve assembly 122, the orifice opening 183 and orifice plate 184 cooperate to restrict fluid flow from the space 164 in the valve actuator member 158 as follows. As the jack piston 98 is moved into a retracted position by bleeding pressurized fluid from the cavity 108 in the lightly loaded suspension unit, the valve actuator member 158 is moved downwardly so as to displace fluid from the pressurizable cavity 150 thence through the opening 172 in the valve stem 168 and through the interior space 166 therein into the fluid space 164. Flow from the fluid space 164 is restricted across the opening 185 sufficiently to produce a hydraulic link between the jack piston 98 and the poppet valve member 142 that forces the valving disc member 144 into a closed position. As the valve actuator 158 moves downwardly, the fluid control sleeve 156 is moved with respect to the sleeve extension 180 on the flow damper member 174 so that the sleeve extension 180 covers the openings 154 from the space 164. At this time, the pin 182 on the flow control sleeve 156 is shifted in the opening 181 on the damper member 174 to the position shown in FIGURE 7. This maintains poppet valve member 142 closed irrespective of a reduced jack pressure in the pressurizable cavity 108. Fluid bleeds across the orifice 185 back into the jack cavity 108 whereby the poppet valve member 142 is forced open by the spring 146 whereby jack fluid is exhausted into the reservoir chamber 69. Thus, jack retraction on the lightly loaded unit is delayed as the vehicle passes through the curve thereby preventing a complete collapse or retraction of the jack unit 92 so as to enable the lightly loaded unit to return to a normal loading extension when the vehicle returns to a straight road.

When loading is removed from the sprung mass, the force acting on the movable spring seat 116 is reduced so as to reduce the pressure in the cavity 108. The jack then retracts at the above-stated controlled bleed down rate until the valve forces are such that the valve opening spring 146 will open the valve member 142 so as to exhaust fluid from the cavity, as discussed above, back into the reservoir 69 until the jack piston 98 moves to a retracted position where the resultant opening and closing forces on the poppet valve member 142 are balanced. At this point, the poppet valve member 142 will pulsatingly open and close to maintain the movable spring seat 116 at a desired height position for the lesser loading.

When the jack unit 92 is moved to a retracted position, as shown in FIGURE 7, the guide stem 168 will eventually be contacted by the valve actuator member 158. The stem 168 has grooves 186, 188 in the upper end that allow for a limited amount of stem flexure that prevents undesirable transfer of force to other portions of the valve assembly 122. Additionally, a stop element 190 is fastened over the end of stem 168 to engage actuator member 158 upon a predetermined jack extension whereby further jack extension will open the valve member 142 to prevent

What is claimed is as follows:

1. A self-adjusting extensible spring seat comprising, a fixed tubular member, a movable tubular member telescopingly embracing said fixed member, a fluid intake passage and a fluid exhaust passage formed in said fixed member, a variable volume pressurizable cavity formed between said members, a valve assembly within said cavity including a valving element for controlling flow of fluid from said cavity through said exhaust passage, said valve assembly further including diaphragm means directly responsive to the pressure in said cavity to bias said valving element to a closed position and opposing spring means for selectively opening said valving element against said cavity pressure for discharging fluid from said cavity through said exhaust passage.

2. A self-adjusting extensible spring seat comprising, a fixed tubular member, a movable tubular member telescopingly embracing said fixed member, a fluid intake passage and a fluid exhaust passage formed in said fixed member, a variable volume pressurizable cavity formed between said members, a valve assembly within said cavity including a valving element solely operative to control flow of fluid from said cavity through said exhaust passage, said valve assembly further including diaphragm means directly responsive to the pressure in said cavity to move said valving element to a closed position and opposing spring means for selectively opening said valving element against said cavity pressure for discharging fluid from said cavity through said exhaust passage.

3. A self-adjusting extensible spring seat comprising, a fixed tubular member, a movable tubular member telescopingly embracing said fixed member, a fluid intake passage and a fluid exhaust passage formed in said fixed member a variable volume pressurizable cavity formed between said members, a valve assembly within said passageway including a valving element for controlling flow of fluid from said cavity through said exhaust passage, said valve assembly further including diaphragm means directly responsive to the pressure in said cavity and opposing spring means for selectively opening said valving element against said cavity pressure for discharging fluid from said cavity through said exhaust passage, said valving assembly including a second spring therein for modulating the valve opening action of said first spring in response to relative movement between said fixed and movable members.

4. In combination with a primary coil spring disposed between a sprung mass and an unsprung mass, an adjustable spring seat supportingly receiving one end of said coil spring, a hydraulic shock absorber adapted to be connected between the sprung and unsprung masses, hydraulic jack means including a movable piston member fixed to said adjustable spring seat and a fixed member secured to said shock absorber, said fixed jack member and said jack piston member forming a variable volume pressurizable cavity, said shock absorber including reservoir means and fluid outlet means, first passageway means for directly communicating said fluid outlet means from said shock absorber with said variable volume cavity, second passageway means for communicating said cavity with said reservoir, said shock absorber being operable to direct pressurized fluid interiorly of said jack cavity for producing a predetermined relative movement between said fixed and movable members for adjusting the position of said adjustable spring seat, and control means directly responsive to load increases on said sprung mass solely operable to control flow of fluid from said cavity through said second passageway means into said reservoir whereby said movable spring seat is displaced to maintain a desired height relationship between the sprung and unsprung masses.

5. In combination with a primary coil spring disposed between a sprung mass and an unsprung mass, an adjustable spring seat supportingly receiving one end of said coil spring, a hydraulic shock absorber adapted to be connected between the sprung and unsprung masses, hydraulic jack means including a movable piston member fixed to said adjustable spring seat and a fixed member secured to said shock absorber, said fixed jack member and said jack piston member forming a variable volume pressurizable cavity, said shock absorber including reservoir means and fluid outlet means, first passageway means for directly communicating said fluid outlet means from said shock absorber with said variable volume cavity, second passageway means for communicating said cavity with said reservoir, said shock absorber being operable to direct pressurized fluid interiorly of said jack cavity for producing a predetermined relative movement between said fixed and movable members for adjusting the position of said adjustable spring seat, and control means directly responsive to load increases on said sprung mass operable to control flow of fluid from said cavity through said second passageway means into said reservoir whereby said movable spring seat is displaced to maintain a desired height relationship between the sprung and unsprung masses, said control means including a poppet valve element biased closed by the pressure in said cavity, a first control spring opposing the valve closing force and a second control spring for modulating the action of first spring in accordance with the relative position between said fixed and movable jack members.

6. A self-pumping suspension unit comprising, a fixed seat adapted to be associated with one of a pair of sprung and unsprung masses, a movable spring seat located adjacent the other of the masses, a main suspension spring disposed between said seats, a hydraulic shock absorber having the opposite ends thereof adapted to be connected between the masses, said shock absorber including a variable volume chamber formed in part by an end closure member having an inlet and an outlet passageway therein, reservoir means in said shock absorber communicating with said inlet passageway, hydraulic jack means including a fixed member and a movable member telescopingly embracing said fixed member, said fixed and movable members forming a variable volume fluid cavity therebetween, said movable member being fixedly secured to said movable spring seat, said fixed member being secured to said shock absorber, inlet and outlet passageway means in said fixed member, said inlet passageway means receiving fluid from the outlet passageway of said shock absorber for directly passing pressurized fluid into said jack cavity, and control means responsive directly to changes in the weight of the sprung mass and operable to control flow of fluid from said cavity through said outlet passageway means in said fixed member into said reservoir means whereby the movable spring seat is adjusted to compensate for coil spring compression resulting from increased loading on the sprung mass so as to maintain a predetermined height relationship between the sprung and unsprung masses.

7. In the combination of claim 6, said control means including a movable poppet valve element located in said cavity upstream of said outlet passageway means in said fixed member.

8. In a vehicle having a sprung and an unsprung mass, a self-leveling suspension system for association with the sprung mass and an unsprung mass for maintaining a predetermined height relationship therebetween including the combination of, a fixed seat associated with one of the masses, a movable spring seat located adjacent the other of the masses, a main suspension spring disposed between said seats, a hydraulic shock absorber having the opposite ends thereof connected between the masses, said shock absorber including a variable volume chamber formed in part by an end closure member having an inlet and an outlet passageway therein, reservoir means in said shock absorber communicating with said inlet passageway, hydraulic jack means including a fixed member and a movable member telescopingly embracing said fixed member, said fixed and movable members forming a variable volume fluid cavity therebetween, said movable member being fixedly secured to said movable spring seat, said fixed member being secured to said shock absorber, inlet and outlet passageway means in said fixed member, said inlet passageway means receiving fluid from the outlet passageway of said shock absorber for directly discharging pressurized fluid into said jack cavity, and control means responsive directly to changes in the weight of the sprung mass and operable to control flow of fluid from said cavity through said outlet passageway means in said fixed member into said reservoir means whereby the movable spring seat is adjusted to compensate for coil spring compression resulting from increased loading on the sprung mass so as to maintain a predetermined height relationship between the sprung and unsprung masses.

9. In the combination of claim 8, said control means including a movable poppet valve element located in said cavity upstream of said outlet passageway means in said fixed member.

10. In a combination shock absorber and fluid suspension system the combination of, a shock absorber having relatively movable cylinder and piston members adapted to be connected respectively to an unsprung and a sprung mass and including means therein responding to relative movement between the sprung and unsprung masses for damping such movements, means forming a reservoir, a main suspension spring supportingly receiving the weight of the sprung mass, a load carrying piston cylinder unit having a pressurizable variable volume cavity therein and including a portion thereof adapted to supportingly receive said suspension spring, means for communicating the pressurizable cavity of the load carrying piston cylinder unit with said shock absorber cylinder whereby relative movement of said piston directs fluid from said cylinder into said unit, means for controlling fluid flow between said pressurizable load carrying piston cylinder unit and said reservoir including a valving element, diaphragm means responsive to the pressure in said unit for biasing said valving element closed, a modulating spring associated with said valving element for balancing the action of said diaphragm means for selectively maintaining a predetermined volume in the pressurizable cavity of the load carrying cylinder and piston unit for maintaining a predetermined height relationship between the sprung and unsprung masses.

11. A combination shock absorber and fluid suspension unit comprising cylinder means forming a chamber, a piston adapted to be reciprocated within said chamber including means thereon for dividing said chamber into two variable volume compartments, a fluid outlet from one of said compartments, enclosure means forming a fluid reservoir surrounding said cylinder means, a jack piston member surrounding said enclosure means being relatively reciprocable with respect thereto, said jack piston member having a portion thereon in spaced relationship to the outer surface of said enclosure means for forming a variable volume pressurizable cavity therebetween communicating with said fluid outlet whereby reciprocation of said piston directs fluid into said cavity, seal means on either end of said tubular member for preventing fluid leakage exteriorly of said pressurizable cavity, fluid control means responsive to changes in the weight on a sprung mass associated with the shock absorber for controlling flow between said reservoir and said pressurizable cavity for producing a predetermined movement of said piston member, spring means supported on said movable piston member adjustable thereby to act on the sprung mass to move it with respect to an unsprung mass for maintaining a predetermined height therebetween, said fluid control means including means forming a passageway communicating said pressurizable cavity with said reservoir, valve means opening and closing said passageway to fluid flow therethrough, a first control spring means biasing said valve means open, diaphragm means responsive to pressure in said cavity biasing said valve means closed and a second control spring means responsive to movement of said jack piston for balancing the resultant force on said valve means to maintain a predetermined pressure in said cavity for producing the desired height relationship between the sprung and unsprung masses.

12. A combination shock absorber and fluid suspension unit comprising cylinder means forming a chamber, a piston adapted to be reciprocated within said chamber including means thereon for dividing said chamber into two variable volume compartments, a fluid outlet from one of said compartments, enclosure means forming a fluid reservoir surrounding said cylinder means, a jack piston member surrounding said enclosure means being relatively reciprocable with respect thereto, said jack piston member having a portion thereon in spaced relationship to the outer surface of said enclosure means for forming a variable volume pressurizable cavity therebetween communicating with said fluid outlet whereby reciprocation of said piston directs fluid into said cavity, seal means on either end of said tubular member for preventing fluid leakage texteriorly of said pressurizable cavity, fluid control means responsive to changes in the weight on a sprung mass associated with the shock absorber for controlling flow between said reservoir and said pressurizable cavity for producing a predetermined movement of said piston member, spring means supported on said movable piston member adjustable thereby to act on the sprung mass to move it with respect to an unsprung mass for maintaining a predetermined height therebetween, said fluid control means including means forming a passageway communicating said pressurizable cavity with said reservoir, valve means opening and closing said passageway to fluid flow therethrough, a first control spring means biasing said valve means open, diaphragm means responsive to pressure in said cavity biasing said valve means closed and second control spring means responsive to movement of said jack piston for balancing the resultant force on said valve means to maintain a predetermined pressure in said cavity for producing the desired height relationship between the sprung and unsprung masses, said control spring means, valve means and diaphragm means being located on a common axis located in spaced parallelism with the longitudinal axis of said shock absorber unit.

13. A combination shock absorber and fluid suspension unit comprising cylinder means forming a chamber, a piston adapted to be reciprocated within said chamber including means thereon for dividing said chamber into two variable volume compartments, a fluid outlet from one of said compartments, enclosure means forming a fluid reservoir surrounding said cylinder means, a jack piston member surrounding said enclosure means being relatively reciprocable with respect thereto, said jack piston member having a portion thereon in spaced relationship to the outer surface of said enclosure means for forming a variable volume pressurizable cavity therebetween communicating with said fluid outlet whereby reciprocation of said piston directs fluid into said cavity, seal means on either end of said tubular member for preventing fluid leakage exteriorly of said pressurizable cavity, fluid control means responsive to changes in the weight on a sprung mass associated with the shock absorber for controlling flow between said reservoir and said pressurizable cavity for producing a predetermined movement of said piston member, spring means supported on said movable piston member adjustable thereby to act on the sprung mass to move it with respect to an unsprung mass for maintaining a predetermined height therebetween, said fluid control means including means forming a passageway communicating said pressurizable cavity with said reservoir, valve means opening and closing said passageway to fluid flow therethrough, a first control spring means biasing said valve means open, diaphragm means responsive to pressure in said cavity biasing said valve means closed and a second control spring means responsive to movement of said jack piston for balancing the resultant force on said valve means to maintain a predetermined pressure in said cavity for producing the desired height relationship between the sprung and unsprung masses, said fluid control means further including means for damping valve opening movement, said damping means including means responsive to jack retraction to effect controlled return of fluid from said jack cavity into said reservoir.

14. A combination shock absorber and fluid suspension unit comprising cylinder means forming a chamber, a piston adapted to be reciprocated within said chamber including means thereon for dividing said chamber into two variable volume compartments, a fluid outlet from one of said compartments, enclosure means forming a fluid reservoir surrounding said cylinder means, a jack piston member surrounding said enclosure means being relatively reciprocable with respect thereto, said jack piston member having a portion thereon in spaced relationship to the outer surface of said enclosure means for forming a variable volume pressurizable cavity therebetween communicating with said fluid outlet whereby reciprocation of said piston directs fluid into said cavity, seal means on either end of said tubular member for preventing fluid leakage exteriorly of said pressurizable cavity, fluid control means responsive to changes in the weight on a sprung mass associated with the shock absorber for controlling flow between said reservoir and said pressurizable cavity for producing a predetermined movement of said piston member, spring means supported on said movable piston member adjustable thereby to act on the sprung mass to move it with respect to an unsprung mass for maintaining a predetermined height therebetween, said fluid control means including means forming a passageway communicating said pressurizable cavity with said reservoir, valve means opening and closing said passageway to fluid flow therethrough, a first control spring means biasing said valve means open, diaphragm means responsive to pressure in said cavity biasing said valve means closed and a second control spring means responsive to movement of said jack piston for balancing the resultant force on said valve means to maintain a predetermined pressure in said cavity for producing the desired height relationship between the sprung and unsprung masses, said fluid control means further including means for damping valve opening movement, said damping means including means responsive to jack retraction to effect controlled return of fluid flow from said jack cavity into said reservoir, said damping means further including a tubular element fixed to said jack piston for movement therewith including openings therein communicating with said cavity, a fluid control sleeve slidably supported thereon to block said openings for forming a variable volume damping chamber therein, and orifice means for controlling fluid flow from said variable volume damping chamber, said tubular member being movable with respect to said valve means upon jack retraction for producing a predetermined valve closing force on said valve means dependent upon flow from said damping chamber across said orifice means whereby jack retraction is maintained under the control of fluid flow through said orifice means.

15. In a combination shock absorber and fluid suspension unit the combination of, a shock absorber having an outer cylindrical surface, a pumping cylinder arranged coaxially of said outer surface in spaced relationship therewith to form a fluid reservoir between said surface and said pumping cylinder, a piston rod extending exteriorly of said pumping cylinder having a first support mount on one end thereof adapted to be connected to a sprung mass, a second support mount on the end of said outer surface adapted to be connected to an unsprung mass, a movable tubular jack piston member surrounding said outer cylindrical surface including a portion thereon spaced from said surface to form a pressurizable variable volume cavity between said piston member and cylindrical surface, means for sealing the opposite ends of said piston member for preventing leakage exteriorly of said pressurizable cavity, spring means supported between said tubular jack piston member and said first support mount for directing a predetermined portion of the weight of the sprung mass against said movable jack piston member for pressurizing said cavity, fluid control means responsive to the pressure in said cavity for controlling flow of fluid between said reservoir and said pressurizable cavity for moving said tubular member into a predetermined relationship with the shock absorber to maintain a predetermined height relationship between the sprung and unsprung masses, said fluid control means including means forming a passageway communicating said pressurizable cavity with said reservoir, valve means opening and closing said passageway to fluid flow therethrough, first control spring means biasing said valve means open, diaphragm means responsive to pressure in said cavity biasing said valve means closed and a second control spring means responsive to movement of said jack piston member for balancing the resultant force on said valve means to maintain a predetermined volume in said cavity for producing the desired height relationship between the sprung and unsprung masses.

16. In a combination shock absorber and fluid suspension unit the combination of, a shock absorber having an outer cylindrical surface, a pumping cylinder arranged coaxially of said outer surface in spaced relationship therewith to form a fluid reservoir between said surface and said pumping cylinder, a piston rod extending exteriorly of said pumping cylinder having a first support mount on one end thereof adapted to be connected to a sprung mass, a second support mount on the end of said outer surface adapted to be connected to an unsprung mass, a movable tubular jack piston member surrounding said outer cylindrical surface including a portion thereon spaced from said surface to form a pressurizable variable volume cavity between said piston member and cylindrical surface, means for sealing the opposite ends of said piston member for preventing leakage exteriorly of said pressurizable cavity, spring means supported between said tubular jack piston member and said first support mounting for directing a predetermined portion of the weight of the sprung mass against said movable jack piston member for pressurizing said cavity, fluid control means responsive to the pressure in said cavity for controlling flow of fluid between said reservoir and said pressurizable cavity for moving said tubular member into a predetermined relationship with the shock absorber to maintain a predetermined height relationship between the sprung and unspdung masses, said fluid control means including means forming a passageway communicating said pressurizable cavity with said reservoir, valve means opening and closing said passageway to fluid flow therethrough, first control spring means biasing said valve means open, diaphragm means responsive to pressure in said cavity biasing said valve means closed and a second control spring means responsive to movement of said jack piston member for balancing the resultant force on said valve means to maintain a predetermined volume in said cavity for producing the desired height relationship between the sprung and unsprung masses, said control spring means, valve means and diaphragm means being located on a common axis located in spaced parallelism with the longitudinal axis of said shock absorber unit.

17. In a combination shock absorber and fluid suspension unit the combination of, a shock absorber having an outer cylindrical surface, a pumping cylinder arranged coaxially of said outer surface in spaced relationship therewith to form a fluid reservoir between said surface and said pumping cylinder, a piston rod extending exteriorly of said pumping cylinder having a first support mount on one end thereof adapted to be connected to a sprung mass, a second support mount on the end of said outer surface adapted to be connected to an unsprung mass, a movable tubular jack piston member surrounding said outer cylindrical surface including a portion thereon spaced from said surface to form a pressurizable variable volume cavity between said piston member and cylindrical surface, means for sealing the opposite ends of said piston member for preventing leakage exteriorly of said pressurizable cavity, spring means supported between said tubular jack piston member and said first support mounting for directing a predetermined portion of the weight of the sprung mass against said movable jack piston member for pressurizing said cavity, fluid control means responsive to the pressure in said cavity for controlling flow of fluid between said reservoir and said pressurizable cavity for moving said tubular member into a predetermined relationship with the shock absorber to maintain a predetermined height relationship between the sprung and unsprung masses, said fluid control means including means forming a passageway communicating said pressurizable cavity with said reservoir, valve means opening and closing said passageway to fluid flow therethrough, first control spring means biasing said valve means open, diaphragm means responsive to pressure in said cavity biasing said valve means closed and a second control spring means responsive to movement of said jack piston member for balancing the resultant force on said valve means to maintain a predetermined volume in said cavity for producing the desired height relationship between the sprung and unsprung masses, said fluid control means further including means for damping valve opening movement, said damping means including means responsive to jack retraction to effect a controlled slow flow of fluid from said jack cavity into said reservoir.

18. In a combination shock absorber and fluid suspension unit the combination of, a shock absorber having an outer cylindrical surface, a pumping cylinder arranged coaxially of said outer surface in spaced relationship therewith to form a fluid reservoir between said surface and said pumping cylinder, a piston rod extending exteriorly of said pumping cylinder having a first support mount on one end thereof adapted to be connected to a sprung mass, a second support mount on the end of said outer surface adapted to be connected to an unsprung mass, a movable tubular jack piston member surrounding said outer cylindrical surface including a portion thereon spaced from said surface to form a pressurizable variable volume cavity between said piston member and cylindrical surface, means for sealing the opposite ends of said piston member for preventing leakage exteriorly of said pressurizable cavity, spring means supported between said tubular jack piston member and said first support mounting for directing a predetermined portion of the weight of the sprung mass against said movable jack piston member for pressurizing said cavity, fluid control means responsive to the pressure in said cavity for controlling flow of fluid between said reservoir and said pressurizable cavity for moving said tubular member into a predetermined relationship with the shock absorber to maintain a predetermined height relationship between the sprung and unsprung masses, said fluid control means including means forming a passageway communicating said pressurizable cavity with said reservoir, valve means opening and closing said passageway to fluid flow therethrough, first control spring means biasing said valve means open, diaphragm means responsive to pressure in said cavity biasing said valve means closed and a second control spring means responsive to movement of said jack piston member for balancing the resultant force on said valve means to maintain a predetermined volume in said cavity for producing the desired height relationship between the sprung and unsprung masses, said fluid control means further including means for damping valve opening movement, said damping means including means responsive to jack retraction to effect a controlled slow flow of fluid from said jack cavity into said reservoir, said damping means including a tubular element fixed to said jack piston for movement therewith including openings therein communicating with said cavity, a fluid control sleeve slidably supported thereon to block said openings for forming a variable volume damping chamber therein, and orifice means for controlling fluid flow from said variable damping chamber to damp valve opening movement, said tubular member being movable with respect to said valve means upon jack retraction for producing a predetermined valve closing force on said valve means dependent upon flow from said damping chamber across said orifice means whereby jack retraction is maintained under the control of fluid through said orifice means.

References Cited

UNITED STATES PATENTS

| | | | |
|---|---|---|---|
| 2,592,391 | 4/1952 | Butterfield | 267—65 |
| 3,179,401 | 4/1965 | Bartram et al. | 267—65 |

ARTHUR L. LA POINT, *Primary Examiner.*

R. M. WOHLFARTH, *Assistant Examiner.*